Dec. 31, 1940.   H. A. WIENEKE   2,227,239
FILTERING APPARATUS
Filed May 19, 1938
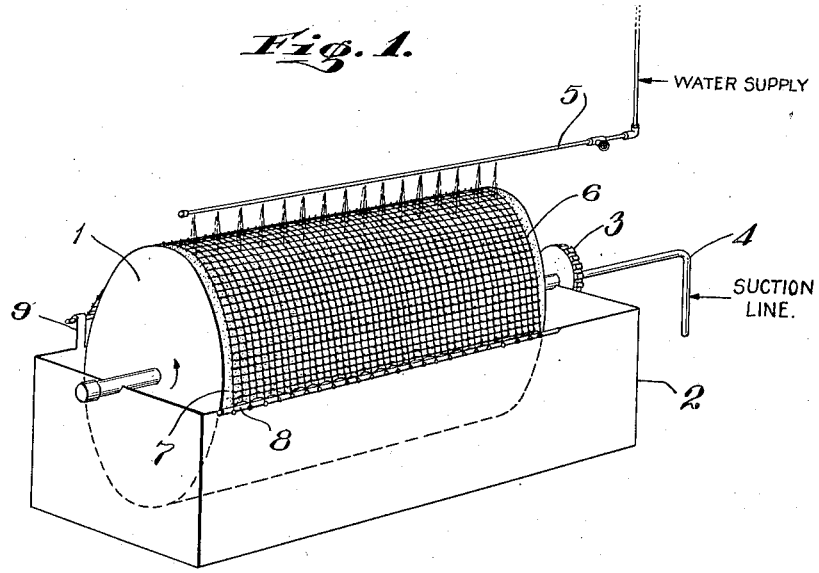
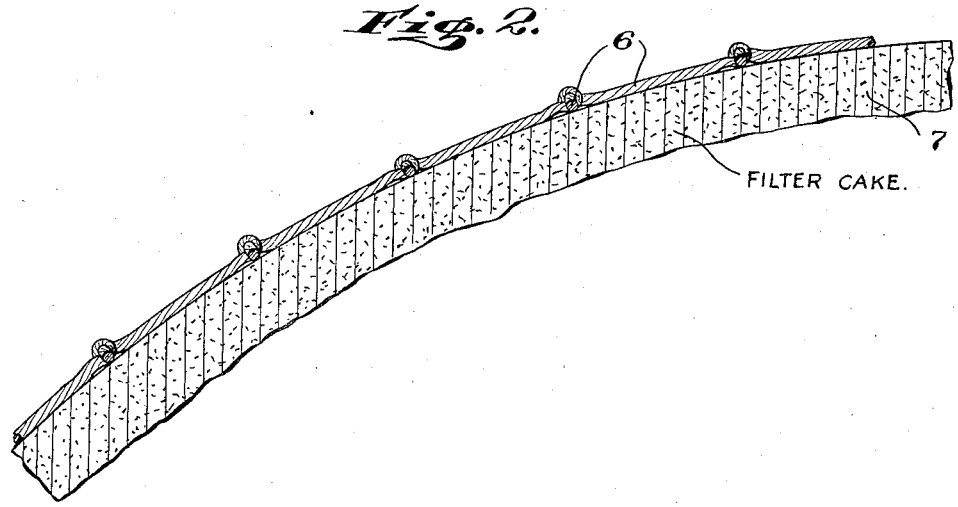
INVENTOR
HENRY A. WIENEKE
BY
*Charles F. Kaegebeh*
ATTORNEY Patented Dec. 31, 1940

2,227,239

UNITED STATES PATENT OFFICE 2,227,239

FILTERING APPARATUS

Henry A. Wieneke, New Brunswick, N. J., assignor to National Lead Company, New York, N. Y., a corporation of New Jersey Application May 19, 1938, Serial No. 208,749

5 Claims. (Cl. 210—199)

The invention relates to filters and more especially to filtering and like apparatus particularly to the so-called rotary filter type wherein a filter mass or cake, carried on a moving surface, is required to be treated or washed by the application of liquid or water thereto. The general object of the invention is an improvement in the means and method of applying the liquid to the cake so that all the latter can be adequately and equally treated or washed and with little or no excess of liquid likely to drain into the tank below or otherwise to require special disposal.

The drawing shows the principle of the invention diagrammatically, Fig. 1 being a perspective diagram of a conventional type of rotary filter having a form of the invention applied, and Fig. 2 being an enlarged section.

The filtering element is in the form of a cylindrical rotary drum marked 1, which may be constructed and operated in all respects according to well known practice; for example, as disclosed in my prior Patent No. 2,083,887, issued June 15, 1937. It dips on its lower side into a tank 2 containing the slurry or other material to be filtered and may be assumed to be equipped with all the usual and necessary filtering appurtenances being slowly rotated by the gear 3 and its interior being kept at a relatively reduced pressure by means of a suction line 4 entering through one of its trunnions. The filter cake 7 forms on the cylindrical surface as the drum rotates, and is the material that is to be washed or treated by this invention.

The source of treating liquid for this purpose is indicated as a multi-jet spray pipe 5 mounted above the ascending side of the drum, and will be understood to deliver the liquid at equal rates from all of its jets so that the delivery will be uniform from one end of the drum to the other. Any other spray source could be substituted.

The liquid is ordinarily sucked through the cake, which is permeable, by the effect of the internal negative pressure and in passing through the mass carries with it any mother-liquor still retained therein or other matter therein regarded as impurity or desired to be removed. Heretofore careful manipulation of the liquid spray has been necessary to insure thoroughness in this result and uniformity of contact and complete passage of the liquid through the cake and into the drum, instead of spilling it down the side of the cake into the dip-tank or source of material to be filtered where it is of course objectionable. Nevertheless, even in spite of the most careful manipulation the treating liquid always had a tendency to form channels or rivulets and in this form to run down the side of the drum without evenly wetting the surface of the filter cake.

According to this invention, all such required skilful manipulation is rendered unnecessary and better and more uniform results are secured automatically by simply casting a flexible reticulated distributer 6 over the drum to rest and ride upon the filter cake 7 thereon as the latter revolves. A piece of ordinary fish-net or tennis-net made of cotton twine suffices very well for a distributer. On the other hand, the distributer may be constructed of any suitable material: Rubber strands, rubber covered wire, fiber glass strands, and the like will all serve and are particularly useful where the treating liquid is corrosive in nature, as are acids and alkalis. Preferably, as will be understood, parts of the distributer, e. g. the strands thereof, which rest and ride upon the filter cake should be round in cross-section or, at least on their under surface which rests upon the cake, smooth so that they will not dig into and scrape the cake off the drum and, naturally, one would not employ sharp wire or screening which would have a tendency to scrape and dip up the cake. The distributer can be attached in any convenient way, as indicated at 8, to some fixed part of the structure, on the ascending side of the drum, and for security it is tied to fixed part 9 at the other or descending side, at a point somewhat above the scrapers usually located on that side though not shown in the drawing. However, the flexible distributer need not be cast over both sides of the drum but equally satisfactory results are obtained if the distributer is disposed in contact with only one side of the drum, either the descending or ascending side, depending upon the direction of rotation. When so disposing the distributer on only one side of the drum it is, of course, necessary that it be placed on the side down which the treating liquid is directed to flow from the spray jets.

The reticulated distributer thus constitutes a flexible liquid-retaining or retarding structure intervening between the liquid source and the filter cake, conforming to the surface of the cake. The liquid from the spray-jets more or less fills the reticulations of the net and in this manner is distributed horizontally across the surface of the filter cake. The formations of rivulets or channels of the washing liquid is thus prevented. The shape of the reticulations is not of consequence; they may in fact be of any convenient shape such as are formed by strands of the distributer crossing each other diagonally at an angle to the axis of the drum or at right angles parallel and perpendicular to the axis of the drum. Fig. 2 shows a very convenient type of arrangement with one set of strands contacting the filter cake horizontally, parallel to the axis of the drum. It is important, however, that the reticulations be of such shape and relation, one to the other, that they will act as small dams from which the liquid overflows from one row of reticulations to the next and so on producing in effect a cascading of the liquid down the surface of the filter cake. Thus, the passage of the liquid over the cake is sufficiently retarded and distributed over the surface of the cake so that practically all of it becomes drawn through the cake into the drain and little or none of it drains into the dip-tank below.

Since the spray-jets are of equal delivery rates and equally spaced apart and since all of the reticulations are substantially of equal size, the amount of water or liquid supplied to each unit area of the revolving cake is uniform throughout, and it thus becomes a simple matter to regulate the rate of liquid supplied by pipe 5 to the rate of absorption by the cake so that all of it is used without objectionable excess. Within the possibilities of the balance thus obtained, it will be appreciated that the suction and rotary speed can be increased, a large volume of treating liquid may be employed and filtering efficiency generally improved as compared to prior practices. It will also be observed that within the principle above explained the specific form of liquid distributing, retaining or retarding structure is subject to considerable variation as aforesaid, according to the kind of filter, the material filtered and the general nature of the treatment.

The foregoing description has been given for clearness of understanding and no undue limitations should be deduced therefrom but the amended claims should be construed as broadly as possible in view of the prior art.

I claim:
1. Apparatus of the kind described, comprising a moving filter surface adapted to form and carry a filter cake, a flexible liquid-retaining open reticulated structure adapted to rest upon said cake, means for securing said structure in a stationary position relative to said moving cake and means for keeping the structure filled or partially filled with a liquid.

2. In apparatus of the kind described, the combination of a rotary filter drum, a supply of liquid for treatment of the filter cake forming on such drum and a plurality of stationary, horizontal, open, flexible, liquid-retarding dam members riding on and conforming to the surface of such cake and being disposed to receive and distribute washing liquid poured thereon.

3. Apparatus of the kind described, comprising a rotary, suction-connected filter drum adapted to form and carry a filter cake on its cylindrical surface, a flexible open reticulated relatively non-absorbent structure adapted to rest upon the said cake, means for securing said structure in a relatively stationary position and means for keeping the reticulations filled or partially filled with a liquid.

4. Filtering apparatus comprising a suction-connected filter drum, mounted to rotate in a tank of liquid to be filtered and adapted to form and carry a filter cake on its peripheral surface, and a stationary flexible open reticulated and relatively non-absorbent structure cast over and riding upon the surface of such cake and being disposed to receive and distribute washing liquid poured thereon.

5. In apparatus of the kind described, the combination of a rotary filter drum adapted to hold a filter cake on its cylindrical surface, a stationary, open, reticulated, relatively non-absorbent, liquid distributer riding on said cake, and means for delivering washing liquid to the surface of said cake over which the said distributter rides.

HENRY A. WIENEKE.